United States Patent [19]

Rawson

[11] 4,143,943
[45] Mar. 13, 1979

[54] REAR PROJECTION SCREEN SYSTEM

[75] Inventor: Eric G. Rawson, Saratoga, Calif.

[73] Assignee: Xerox Corporation, Stamford, Conn.

[21] Appl. No.: 769,620

[22] Filed: Feb. 17, 1977

[51] Int. Cl.² .............................................. G03B 21/56
[52] U.S. Cl. .................................................. 350/120
[58] Field of Search ................... 350/120; 272/10, 12, 272/8 P

[56] References Cited

U.S. PATENT DOCUMENTS

| 1,969,909 | 8/1934 | Simjian | 350/120 |
| 2,029,500 | 2/1936 | O'Brien | 350/120 X |
| 2,348,818 | 5/1944 | Jacobson | 350/120 |

FOREIGN PATENT DOCUMENTS 592815 9/1947 United Kingdom ..................... 350/120

*Primary Examiner*—Richard A. Wintercorn
*Attorney, Agent, or Firm*—Leonard Zalman

[57] ABSTRACT

A rear projection screen which eliminates speckle by only linear diffuser surface motion. One of a pair of closely spaced plates of the rear projection screen is maintained fixed while the other plate is driven such that it has a linear motion relative to the fixed plate. The plates are optically transparent and have their facing surfaces etched or coated to provide adjacent diffusing surfaces. The driven screen is supported by L-shaped spring metal straps thereby providing a strong plate support assembly which can operate at low noise levels and with low drive-power requirements.

1 Claim, 2 Drawing Figures

REAR PROJECTION SCREEN SYSTEM

BACKGROUND OF THE INVENTION

The quality of a rear projection system is determined by several parameters which are described in relation to the user reaction. Several of these parameters are dependent upon the properties of the screen itself either in conjunction with or independent from the rest of the system. Screen fall-off refers to a decrease in the screen brightness at positions to the side of the screen center. This arises from a combination of non-uniformity of the projection system and poor distribution of the light scattered by the screen. Screen resolution relates to the detail visible on the screen independent of the resolution of the projection system. Screen breakthrough is manifested by a bright spot in the screen due to light which is not diffused.

Another effect which is not as easily defined but contributes greatly to eye fatigue is speckle. This is the occurrence of multitudes of tiny bright spots in a light area of the image which seem to dance or scintillate as the viewer moves. This is particularly bothersome for users who must observe a screen for long periods of time, for example, parts catalogs recently have been put on film and are viewed on screens for periods of time ranging up to eight hours a day. Also, instructional speed reading devices employing rear projection screens often are viewed by students for periods of time ranging up to two hours.

In one commercially available rear projection screen speckle is eliminated by employing two screens separated by a few mils. One of the screens is kept in constant orbital motion relative to the other screen by a motor driven mechanism. This rather elaborate motional relationship is effective in reducing speckle but adds considerable expense to the system.

In another type of speckle eliminating screen, an organic compound, such as a liquid crystal, is employed. When the electric field across the compound is beyond a threshold value, the compound undergoes turbulent motion, the optical properties of the compound change dynamically and that change is manifested as a rapid change in the scattering of incident light. That scattering change is effective to eliminate some speckle but once again the system is rather elaborate and expensive and long device lifetimes have not been demonstrated.

OBJECTS OF THE INVENTION

It is an object of the present invention to provide an improved rear projection screen.

It is a further object of the present invention to provide means for effecting linear motion of a diffusing screen with low power requirements, mechanical stability and low cost.

SUMMARY OF THE INVENTION

It has been found that speckle can be eliminated from a rear projection screen system by only linear diffuser screen motion. One of a pair of closely spaced plates forming the rear projection screen is maintained fixed while the other plate is driven such that it has a linear motion relative to the fixed plate. The plates are optically transparent and have their facing surfaces etched or coated to provide adjacent diffusing surfaces. The driven screen is supported by L-shaped spring metal straps which provide low noise levels, low drive-power requirements, mechanical stability and mechanical simplicity.

DETAILED DESCRIPTION OF THE INVENTION

Figure 1:
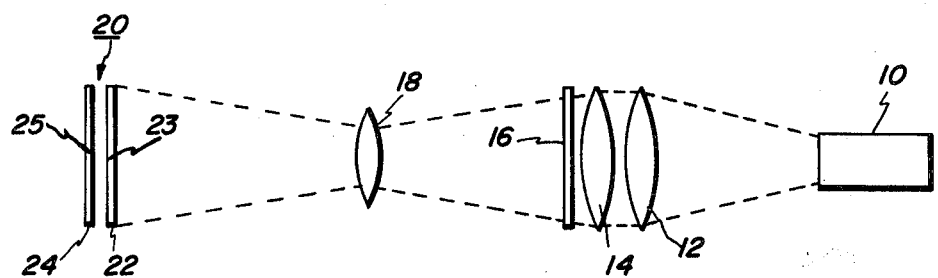
FIG. 1 is a schematic representation of a rear projection viewing system in accordance with the invention.

Referring now to FIG. 1, there is shown schematically a rear projection system in accordance with the invention. A light source 10 directs a high intensity light beam upon a pair of condensing lenses 12 and 14. A film strip mounted upon rollers for translation across the light beam, is disposed in the object plane adjacent the lenses 12 and 14. The resulting image is transmitted via a projection lens 18 and displayed upon a viewing screen assembly 20.

The assembly 20 is comprised of a pair of closely spaced plates 22 and 24 of optically transparent material. The plates 22 and 24 can be of glass or any transparent plastic material having the requisite optical qualities. Also, plates 22 and 24 need not be of the same material, for example, one plate can be glass and the other plastic, nor do the plates 22 and 24 need to be of the same shape and size. The plates 22 and 24 have opposing or facing light diffusing surfaces 23 and 25, respectively. Faces 23 and 25 can be coatings of diffusing material such as a gelatin having fine particles of chlorinated diphenyl resin incorporated therein as taught by U.S. Pat No. 3,640,602. Alternatively, the surfaces 23 and 25 can be formed by grinding the surfaces with a fine grit (typically #600 grade grid) and then etching in a diluted solution of hydrofluoric acid (typically 10% hydrofluoric acid and 90% water) for a period of from about 15 minutes (for a distribution angle of about 8°) to about 1 hour (for a distribution angle of about 4°). In the etching process, the plates are agitated relative to the acid to maintain fresh acid at the surface thereof and the plates are removed from the acid at the appropriate time. The surfaces of the plates 22 and 24 to remain smooth can be protected during the acid etch by coating them with plastic or a photoresist layer which is removed after the etching process.

Speckle is eliminated substantially from the system of FIG. 1 by maintaining the screen 24 stationary and by permitting the screen 22 to have only a linear motion relative to screen 24. By linear motion it is meant that the screen 22 has only one component of motion, for example, only horizontal or only vertical motion, as compared to the two components of motion present with the orbitally moving screen of the referenced U.S. Pat. No. 3,640,602. The realization that only linear motion of the screen 22 can eliminate speckle permits the utilization of a low cost, low power consuming, mechanically stable screen actuating system.

Figure 2:
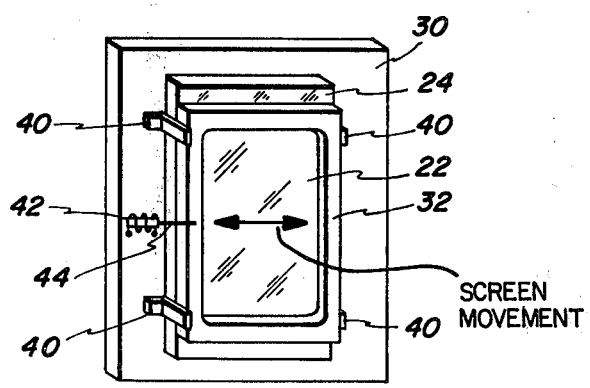
FIG. 2 shows the screen structure of the system of FIG. 1 together with the screen driving mechanism.

A suitable actuating system for screen 22 is shown in FIG. 2 which schematically illustrates the tandem assembly of plates 22 and 24. The stationary or fixed plate 24 is rigidly supported by a baseplate 30. The moving screen 22 is held by a frame 32 which is coupled to the baseplate 30 by four supports 40, one support at or near each corner of the frame 32. The supports 40 are L-shaped lengths of flexible spring straps, typically phosphor-bronze sheet material of approximately ½ inch width, 0.010 inch thickness, and 2 inch length. The spring straps can be attached to the base plate and the frame by any convenient manner such as by screwing or clamping. Linear motion of the screen 22 (which in the case illustrated is a purely horizontal motion of the screen 22) is obtained by an electromagnetic actuator 42 which is anchored to the baseplate 30. The push rod 44 of the actuator 42 is fastened to the frame 32. For example, the electromagnetic actuator 42 can be a 3 inch loudspeaker (with the paper cone removed) driven at 60Hz.

Only a very small linear motion of the plate 22 relative to the stationary plate 24 is required to eliminate speckle. A motion of from 10 to 100 microns is believed sufficient, with a typical motion being a few tens of microns. The air gap between plates 22 and 24 is adjusted to the minimum distance which assures freedom from rubbing between the plates 22 and 24, typically a few hundred microns. Operation theories relating to the speckle eliminating system described can be found in an article appearing in the *Journal of the Optical Society of America*, No. 11, November 1976, pg. 1290, entitled, "Speckle-Free Rear-Projection Screen Using Two Close Screens in Slow Relative Motion."

Several advantages are achieved by utilizing flexible spring straps as the supports 40. First, frictional losses are negligible so drive power requirements are very low. Second, the motion of the screen 22 is completely silent, which is desirable. Third, out-of-plane motions of the plate 22 are negligible compared to the air gap, typically a few microns.

I claim:
1. A rear image projection system comprising:
   first and second closely spaced, optically transparent plates, each of said plates having a light diffusing surface;
   means for projecting an image upon said plates;
   means for maintaining said first screen in a stationary position;
   a plurality of flexible L-shaped spring straps for supporting said second screen; and
   drive means coupled to said second screen for providing said second screen with only a linear motion relative to said first screen.

* * * * *